(12) United States Patent
Bhagwan et al.

(10) Patent No.: US 8,417,694 B2
(45) Date of Patent: Apr. 9, 2013

(54) SYSTEM AND METHOD FOR CONSTRUCTING TARGETED RANKING FROM MULTIPLE INFORMATION SOURCES

(75) Inventors: Varun Bhagwan, San Jose, CA (US); Tyrone Wilberforce Andre Grandison, San Jose, CA (US); Daniel Frederick Gruhl, San Jose, CA (US); Jan Hendrik Pieper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/195,098

(22) Filed: Aug. 20, 2008

(65) Prior Publication Data
US 2009/0248614 A1 Oct. 1, 2009

Related U.S. Application Data

(60) Provisional application No. 61/041,128, filed on Mar. 31, 2008.

(51) Int. Cl.
*G06F 7/00* (2006.01)
*G06F 17/30* (2006.01)

(52) U.S. Cl.
USPC .......................................... 707/723; 707/748

(58) Field of Classification Search .................. 707/706, 707/722, 723, 748
See application file for complete search history.

(56) References Cited

U.S. PATENT DOCUMENTS

| | | | |
|---|---|---|---|
| 6,026,426 A | 2/2000 | Badovinatz et al. | |
| 6,718,324 B2 | 4/2004 | Edlund et al. | |
| 6,728,704 B2* | 4/2004 | Mao et al. ............................ | 1/1 |
| 6,763,338 B2 | 7/2004 | Kirshenbaum | |
| 6,795,820 B2 | 9/2004 | Barnett | |
| 6,901,409 B2 | 5/2005 | Dessloch et al. | |
| 7,107,263 B2 | 9/2006 | Yianilos et al. | |
| 7,188,106 B2 | 3/2007 | Dwork et al. | |
| 7,242,810 B2 | 7/2007 | Chang | |
| 7,257,577 B2 | 8/2007 | Fagin et al. | |
| 7,689,615 B2* | 3/2010 | Burges et al. ................. | 707/723 |
| 7,716,202 B2* | 5/2010 | Slackman ..................... | 707/706 |
| 8,260,787 B2* | 9/2012 | Lam et al. ..................... | 707/748 |

(Continued)

OTHER PUBLICATIONS

S. Adali et al., "The Impact of Ranker Quality on Rank Aggegation Algorithms: Information vs. Robustness*", ICDEW 2006: Proceedings of 22nd Int. Conf. on Data Engineering Workshops, pp. 37-46.

(Continued)

*Primary Examiner* — Robert Beausoliel, Jr.
*Assistant Examiner* — Susan F Rayyan
(74) *Attorney, Agent, or Firm* — Cantor Colburn LLP; Khanh Tran

(57) ABSTRACT

Embodiments of the invention provide a system and method for determining preferences from information mashups and, in particular, a system and method for constructing a ranked list from multiple sources. In an exemplary embodiment, the system and method tunably combines multiple ranked lists by computing a score for each item within the list, wherein the score is a function of the associated rank of the item within the list. In one exemplary embodiment, the function is equal to $1/(n^{(1/p)})$, where p is a tuning parameter that enables selection between responsiveness in the combined ranking to one candidate ranked highly in one source versus responsiveness in the combined ranking to a candidate with lower but broader support among the various sources ranking the candidates.

17 Claims, 5 Drawing Sheets

U.S. PATENT DOCUMENTS

| | | |
|---|---|---|
| 2004/0193698 A1 | 9/2004 | Lakshminarayana |
| 2004/0199419 A1 | 10/2004 | Kim et al. |
| 2005/0097067 A1 | 5/2005 | Kirshenbaum |
| 2005/0246322 A1 | 11/2005 | Ravikumar et al. |
| 2005/0286772 A1 | 12/2005 | Albertelli |
| 2006/0074290 A1 | 4/2006 | Chen et al. |
| 2006/0190425 A1 | 8/2006 | Chang et al. |
| 2007/0016574 A1 | 1/2007 | Carmel et al. |
| 2007/0038625 A1 | 2/2007 | Yang-Stephens et al. |
| 2007/0112720 A1 | 5/2007 | Cao et al. |
| 2007/0250784 A1 | 10/2007 | Riley et al. |
| 2008/0027913 A1 | 1/2008 | Chang et al. |
| 2010/0082639 A1* | 4/2010 | Li et al. ............ 707/748 |
| 2010/0153357 A1* | 6/2010 | Slackman .......... 707/707 |
| 2010/0281023 A1* | 11/2010 | Chevalier et al. ...... 707/723 |

OTHER PUBLICATIONS

K.J. Arrow, "Social Choice and Individual Values", Yale University Press, 1951, 2nd edition, 1963.

M. Balinski et al., "A theory of measuring, electing, and ranking", Proceedings of the National Academy of Sciences, vol. 104, No. 21, May 22, 2007, pp. 8720-8725.

A. Bergson, "A Reformulation of Certain Aspects of Welfare Economics", The Quarterly Journal of Economics, vol. 52, No. 2, 1938, pp. 310-334.

E.F. Codd et al., "Providing OLAP to User-Analysts: An IT Mandate", E.F. Codd & Associates, 1993, 21 pages.

de Borda, "Memory on Elections to Ballot", (originally "Memoire sur les elections au Scrutin"), History of the Royal Academy of Sciences, 1781.

P. Diaconia et al., "Spearman's Footrule as a Measure of Disarray", Journal of the Royal Statistical Society, Series B (Methodological), vol. 39, No. 2, 1977, pp. 262-268.

C. Dwork et al., "Rank Aggregation Methods for the Web", Proceedings of the 10th Int. Conference on World Wide Web, May 1-5, 2001, Hong Kong, pp. 613-622.

R. Fagin et al., "Efficient Similarity Search and Classification via Rank Aggregation", ACM SIGMOD 2003, Jun. 9-12, 2003, San Diego, California, pp. 301-312.

D. Ferrucci et al., "UIMA: An Architectural Approach to Unstructured Information Processing in the Corporate Research Environment", Journal of Natural Language Engineering, vol. 10, No. 3-4, 2004, pp. 327-348.

D. Freitag, "Information Extraction from HTML: Application of a General Machine Learning Approach", Proceedings of the 15th Conf. on Artificial Intelligence/Innovative Applications of AI, 1998, pp. 517-523.

D. Freitag et al., "Boosted Wrapper Induction", Proceedings of the 17th National Conf. on Artificial Intelligence/Innovative Applications of AI, 2000, pp. 577-583.

N. Kushmerick, "Wrapper Induction for Information Extraction", PhD thesis, University of Washington, 1997.

J. Makhoul et al., "Performance Measures for Information Extraction", Proceedings of DARPA Broadcast News Workshop, 1999, pp. 249-252.

M. McIntyre, "Hubbard Hot-Author Status Called Illusion", San Diego Union-Tribune, Apr. 15, 1990.

W. H. Riker, "Liberalism Against Populism", W. H. Freeman and Company, 1982.

D. G. Saari, "Geometry of Voting", vol. 3, Springer-Verlag Berlin—Heidelberg, 1994.

A. P. Sheth, "Changing Focus on Interoperatility in Information Systems: From System, Syntax, Structure to Semantics", Interoperating Geographic Information Systems, 1999, 25 pages.

S. Soderland, "Learning to Extract Text-based Information from the World Wide Web", Proceedings of Third International Conference on Knowledge Discovery and Data Mining (KDD-97), 1997, 4 pages.

Rama K.T. Akkiraju et al., "Recommendation System for Assisting Mashup Developers at Build-Time", Pending U.S. Appl. No. 12/027,315, filed Feb. 7, 2008.

A. Davenport et al., "A Computational Study of the Kemeny Rule for Preference Aggregation", Nineteenth National Conference on Artificial Intelligence (AAAI-04). Sixteenth Innovative Applications of Artificial Intelligence Conference (IAAI-04), Jul. 25-29, 2004, pp. 697-702.

Final Office Action dated Dec. 21, 2011 for related co-pending U.S. Appl. No. 12/195,126.

* cited by examiner

FIGURE 1A

| Rank | A | B | C |
|---|---|---|---|
| 1 | James | Matthew | Jerry |
| 2 | John | Gary | Larry |
| 3 | Robert | Timothy | Betty |
| 4 | Michael | Ronald | Rebecca |
| 5 | Mary | Michael | Virginia |
| 6 | William | Sandra | Kathleen |
| 7 | David | Jose | Sarah |
| 8 | Richard | Larry | Pamela |
| 9 | Charles | James | Frank |
| 10 | Joseph | David | Dennis |

FIGURE 1B

| $\frac{1}{n}$ | $\frac{1}{\sqrt[1.5]{n}}$ | $\frac{1}{\sqrt[2]{n}}$ | $\frac{1}{\sqrt[2.5]{n}}$ | $\frac{1}{\sqrt[3]{n}}$ |
|---|---|---|---|---|
| James | James | James | James | James |
| Jerry | Jerry | Michael | Michael | Michael |
| Matthew | Matthew | Larry | Larry | Larry |
| Larry | Larry | Jerry | Betty | Betty |
| John | Michael | Matthew | Timothy | Timothy |
| Gary | John | Betty | Jerry | David |
| Michael | Betty | Timothy | Matthew | Sarah |
| Betty | Gary | David | David | Ruth |
| Timothy | Timothy | John | Sarah | Virginia |
| Robert | Robert | Sarah | Virginia | Mary |

Narrow support                            Broad support

FIGURE 3A score <u>10</u>|15|20|25|30|35|40|45|50

| | |
|---|---|
| #1 | Rihanna |
| #2 | Eminem |
| #3 | Simple Plan |
| #4 | The Beatles |
| #5 | Timbaland |
| #6 | Britney Spears |
| #7 | In Flames |
| #8 | Belle and Sebastian |
| #9 | Cascada |
| #10 | Green Day |
| #11 | Linkin Park |
| #12 | Miley Cyrus |
| #13 | Paramore |
| #14 | Metallica |
| #15 | 50 Cent |
| #16 | My Chemical Romance |
| #17 | Akon |
| #18 | R.E.M. |
| #19 | Fogging Molly |
| #20 | Fall Out Boy |
| #21 | Bon Jovi |
| #22 | Leona Lewis |
| #23 | Avenged Sevenfold |
| #24 | Nickelback |
| #25 | Billy Joel |
| #26 | We the Kings |
| #27 | Rage Against the Machine |
| #28 | AC/DC |
| #29 | The Medic Droid |
| #30 | Slipknot |
| #31 | Amy Winehouse |
| #32 | Avril Lavigne |
| #33 | Audioslave |
| #34 | The Rolling Stones |
| #35 | Hilary Duff |
| #36 | Van Morrison |
| #37 | Nirvana |
| #38 | Cassie |
| #39 | Deep Purple |
| #40 | Snoop Dogg |
| #41 | Megadeth |

302

FIGURE 3B score 10|15|20|<u>25</u>|30|35|40|45|50

| | |
|---|---|
| #1 | Eminem |
| #2 | Rihanna |
| #3 | The Beatles |
| #4 | Britney Spears |
| #5 | Simple Plan |
| #6 | Linkin Park |
| #7 | Green Day |
| #8 | Cascade |
| #9 | Timbaland |
| #10 | My Chemical Romance |
| #11 | Fall Out Boy |
| #12 | 50 Cent |
| #13 | Avenged Sevenfold |
| #14 | Radiohead |
| #15 | In Flames |
| #16 | Metallica |
| #17 | Paramore |
| #18 | Nickelback |
| #19 | Leona Lewis |
| #20 | Snoop Dogg |
| #21 | Hilary Duff |
| #22 | Bon Jovi |
| #23 | Amy Winehouse |
| #24 | Cassie |
| #25 | Belle and Sebastian |
| #26 | Rage Against the Machine |
| #27 | Slipknot |
| #28 | Akon |
| #29 | Aerosmith |
| #30 | Kate Nash |
| #31 | Miley Cyrus |
| #32 | Coldplay |
| #33 | Arctic Monkeys |
| #34 | R.E.M. |
| #35 | System of a Down |
| #36 | Led Zeppelin |
| #37 | Deep Purple |
| #38 | Flogging Molly |
| #39 | Johnny Cash |
| #40 | 30 Seconds to Mars |
| #41 | Gorillaz |

FIGURE 3C score 10|15|20|25|30|35|40|45|<u>50</u>

| | |
|---|---|
| #1 | Eminem |
| #2 | The Beatles |
| #3 | Rihanna |
| #4 | Lincoln Park |
| #5 | Green Day |
| #6 | Radiohead |
| #7 | Britney Spears |
| #8 | Simple Plan |
| #9 | Fall Out Boy |
| #10 | My Chemical Romance |
| #11 | Avenged Sevenfold |
| #12 | 50 Cent |
| #13 | Snoop Dogg |
| #14 | Cascada |
| #15 | Timbaland |
| #16 | Johnny Cash |
| #17 | Hilary Duff |
| #18 | Cassie |
| #19 | Amy Winehouse |
| #20 | Aerosmith |
| #21 | Bloc Party |
| #22 | Rage Against the Machine |
| #23 | Coldplay |
| #24 | Lostprophets |
| #25 | Kate Nash |
| #26 | Metallica |
| #27 | Killswitch Engage |
| #28 | System of a Down |
| #29 | Arctic Monkeys |
| #30 | Led Zeppelin |
| #31 | 30 Seconds to Mars |
| #32 | Nickelback |
| #33 | Gorillaz |
| #34 | Korn |
| #35 | Paramore |
| #36 | KT Tunstall |
| #37 | Deep Purple |
| #38 | Leona Lewis |
| #39 | Kylie Minogue |
| #40 | Iron Maiden |
| #41 | Lily Allen |

SYSTEM AND METHOD FOR CONSTRUCTING TARGETED RANKING FROM MULTIPLE INFORMATION SOURCES

CROSS-REFERENCE TO RELATED APPLICATIONS

This application claims the benefit of and incorporates by reference in its entirety U.S. provisional application No. 61/041,128, which was filed on Mar. 31, 2008.

FIELD OF INVENTION

The present invention relates to information mashups, and in particular to a system and method for constructing targeted rankings from multiple information sources.

BACKGROUND

Through the advances of technology, today's world has become inundated with information. One continuing technological and societal challenge is finding methods and systems to extract and combine useful data, knowledge, and understanding from a pool of information that is constantly growing in quantity and increasing in granularity.

Even when we narrow our analysis to one domain of interest, e.g. ranking wines, how do we combine all the information indicating preferences within the domain when the information is available from multiples sources and the sources differ in modality? For example, how do we combine multiple lists of preferences, e.g., from different online communities, sales numbers from different stores, etc? How do we combine the information in a manner that will reveal the aspects of that information that are important, valuable, significant to an entity (e.g., a machine, business, customer, end-user, etc.) requesting the results? And how do we enable tuning of the outcome, e.g., at the touch of a button, to target certain characteristics and elevate those characteristics to the forefront?

SUMMARY OF THE INVENTION

A computer-implemented method for tunably combining multiple ranked lists is provided. The method includes receiving multiple lists, wherein each list includes items each having an associated rank, n, within the list. The method further includes combining the items in the multiple lists into a combined list, wherein the combining includes assigning a value to a variable p, the value being neither 0 nor negative; for each list in the multiple lists, computing a score for each item within the list, wherein the score is a function of the associated rank, and wherein the function is equal to $1/(n^{(1/p)})$; for each item, summing corresponding scores to produce a total score for the item; ranking each item based on the corresponding total score of each item; and outputting the combined list based on the ranking. Assigning a value to a variable p may include assigning a value of 2.5 to the variable p. The method may further include increasing the value of the variable p to increase ranking in the combined list of items appearing in a majority of the multiple lists. The method may further include decreasing the value of the variable p to increase ranking in the combined list of items having higher than average associated ranking in a minority of the multiple lists. The method may further include calculating the associated rank n for each item based on a position of the item with the corresponding list in the multiple lists.

Also provided is a user interface for tunably combining multiple ranked lists, the user interface including a display to display a combined list of items from multiple ranked lists, wherein each item in a list of the multiple ranked lists has an associated rank, n, within the list, and wherein the combined list is based on combining the items in the multiple lists, the combining including assigning a value to a variable p, the value being neither 0 nor negative; for each list in the multiple lists, computing a score for each item within the list, wherein the score is a function of the associated rank, and wherein the function is equal to $1/(n^{(1/p)})$; for each item, summing corresponding scores to produce a total score for the item; and ranking each item based on the corresponding total score of each item. The user interface also includes a tool to receive input indicating a new value of p, the tool configured to transmit the input to trigger construction of a new combined list based upon the new value of p.

A computer program product for tunably combining multiple ranked lists is also provided. The computer program product includes a computer readable medium; first program instructions to receive multiple lists, wherein each list includes items each having an associated rank, n, within the list; and second program instructions to combine the items in the multiple lists into a combined list, wherein the combining includes assigning a value to a variable p, the value being neither 0 nor negative; for each list in the multiple lists, computing a score for each item within the list, wherein the score is a function of the associated rank, and wherein the function is equal to $1/(n^{(1/p)})$; for each item, summing corresponding scores to produce a total score for the item; ranking each item based on the corresponding total score of each item; and outputting the combined list based on the ranking, wherein the first and second program instructions are stored on the computer readable media.

A method for providing a combined ranked list from multiple ranked lists is also provided. The method includes receiving an identification of a domain of interest; receiving information describing a business objective; gathering multiple ranked lists on the domain of interest from multiple sources, wherein each list includes items each having an associated rank, n, within the list; combining the items in the multiple lists into a combined list, wherein the combining includes automatically computing a score for each item within each of the multiple lists using a function equal to $1/(n^{(1/p)})$, wherein p is a variable and the value of p is determined based on the business objective and is neither 0 nor negative; and transmitting the combined list. The multiple sources may have differing modalities. Gathering the multiple ranked lists may include gathering unstructured data indicating preferences for items within the domain of interest; and constructing a ranked list from the unstructured data. The method may further include receiving further information describing the business objective; tuning the value of the variable p based on the further information; repeating the combining based on the tuning; and repeating the transmitting based on the repeating of the combining.

BRIEF DESCRIPTION OF THE FIGURES

FIG. 1A shows a table of three ranked lists—A, B, and C.

FIG. 1B shows a table of various combined lists when different values for the tuning parameter p are used.

FIGS. 3A-3C are each screenshots of a website outputting a combined list when certain values of p are used.

DESCRIPTION

Overview

Figure 2:
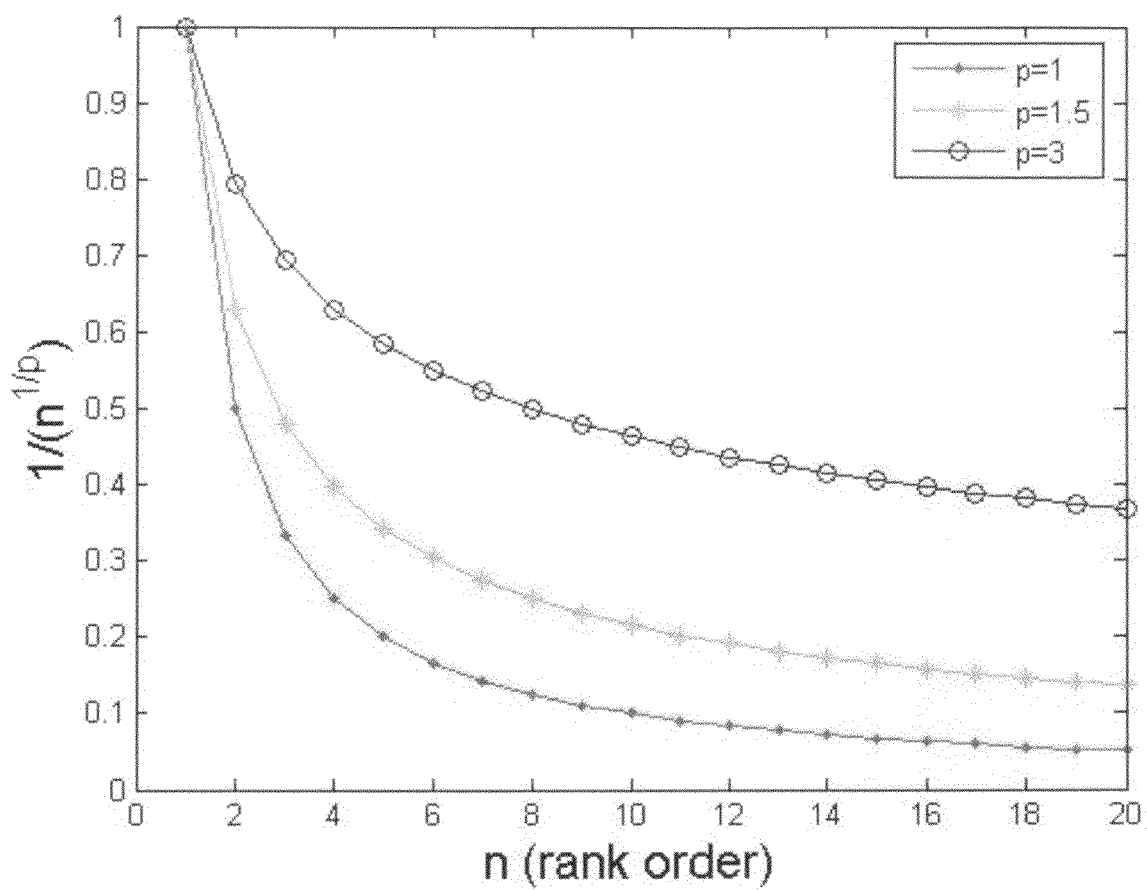
FIG. 2 shows a graph of effects on ranking when the value of the tuning parameter p is changed.

Embodiments of the present invention provide a system and method for constructing targeted rankings from multiple information sources. In an exemplary embodiment, the system and method tunably combines multiple ranked lists by computing a score for each item within the list, wherein the score is a function of the associated rank of the item within the list. In one exemplary embodiment, the function is equal to $1/(n^{(1/p)})$, where p is a tuning parameter that enables selection between responsiveness to one candidate (sometimes referred herein to as an item) ranked highly in one source versus responsiveness to a candidate with lower but broader support among the various sources ranking the candidates. Accordingly, by providing a tunable parameter, the items ranked in the single, merged list may be ranked in a targeted fashion, elevating and revealing items with certain characteristics (e.g., broad appeal) that are inline with, for example, a business reason for constructing the merged list. Thus, tuning of the ranking may be driven by or based on, for example, predetermined business objectives.

For example, in certain situations, strong minority support may be considered more valuable, e.g., when there is a threshold support before certain action is taken. One such situation may be, for example, when a business is more interested in determining which television show has strong support, even when only a minority of the voters has demonstrated that sentiment, before they release a DVD of that television show's season.

In other situations, weaker but broader support may be considered more valuable, e.g., when more general popularity is more appropriate towards meeting a business objective. One such situation may be, for example, when one wants to reward an all time best book, even though the chances of such a book appearing first in a list from any one source (e.g., a voter) may be slim because of the number of books available from which to choose. Each source (e.g., a web site, a New York Times top seller's list, a survey, etc.) is treated in embodiments of this invention as a "voter" in applying vote counting/computing methods, voting theory, and voting systems. The systems and methods for tunably combining multiple ranked lists described in detail herein are particularly advantageous in scenarios in which the number of candidates is significantly larger (for example, orders of magnitudes larger) than the number of voters.

Embodiments of the system and method described in detail herein compliments the system and method for determining preferences from information mashups described in co-pending U.S. patent application Ser. No. 12/195,126, and filed on Aug. 20, 2008. Accordingly, in one use, the system or method described in detail herein may be used in conjunction with the system or method described in detail in the co-pending application. In another use, the first system and method may be used separately from the latter.

Plurality type voting systems are those that add together the number of votes from each source and simply adjudicate the winner based on whomever or whichever candidate has the most votes. Plurality type voting systems include systems in which votes are weighted. Plurality type voting systems have deficiencies when combining information gathered from multiple sources with differing modalities. This can occur, for example, when there are large differences in the numbers returned by sources or when the values measured to derive those numbers indicate very different things.

For example, say we want to combine different on-line data to generate a list of wines. One source of preferences may be generated from sales numbers of wines. Another source may be a list generated from wine tasters. Yet another may be generated by professionals at a wine magazine. Yet another may be generated from counts of comments users post on a wine aficionado site. There are many more sales of wines than posts on a website. Many people buy wines whereas composing a review takes more time and may indicate more interest in a particular vintage. Ultimately, the goal is to combine these multiples sources that indicate interest in all the same underlying subject matter without allowing one source to unduly influence the combined/consensus list.

In more traditional information integration scenarios, systems compare things with identical modalities, such as number of sales from different sources. In this case using a plurality type voting system makes sense. However there are many domains of interests (e.g., patient preferences, drugs for certain medical conditions, cars, wine, financial products (stocks, bonds, etc.), consumer goods, cameras, computers, books, etc.) where information is available from many different modalities (e.g., comments, passive listens, sales, hits on a website, creation of new website, views on television, etc.). In the domain of books, the following information may be available for determining book preferences: book sales and returns, lists of books read, library checkouts, comments on books read (e.g., online, in newspapers, in magazines, on television or radio), etc. How can one combine the data from the various sources when they are heterogeneous in modality? Comparing different modalities is akin to comparing apples and oranges. How does one determine overall rankings for certain wines, for example, based on the combination of data on sales, written reviews, returns, website polls, etc.? How do you combine data indicating that the reviewer loves a certain wine (glowing reviews), but the public hates it (e.g., by ranking it low on wine.com or low sales)? Do we decide that ten times as many posts on a website reflect ten times as much interest in an event or item? There is a fair amount of subjectivity in how these combinations occur and it is not typically clear how to combine all these sources.

The present disclosure differs from traditional work in the field in several ways. For example, the disclosure addresses situations where, as noted, people are providing preferences in non-uniform ways (complaints, purchase, opinion posted, time, etc.). In such situations, ad hoc weights don't work well because ad hoc weights can only adjust for the deficiencies that exist at a simple point in time. Consider the use of ad hoc weights in combining top-10 lists from Amazon.com and Barnes & Noble in 1995. In that year, Amazon.com ranks should be weighted lower (having less weight in the over scheme of the analysis) than Barnes & Noble because Amazon.com opened its online store in July 1995. If the top-10 lists were compared today, the weights would differ. Thus, although ad hocs weights are useful when combining lists of preferences at one point in time, they need adjusting each time new data from the sources are recombined to account for, e.g., changes in the market, business cycles, seasons, time of day, new product releases (which could, for example, skew statistics for a few days), blitz marketing campaigns, events (e.g., Olympics or Superbowl), etc. These real world changes have the potential of causing dramatic shifts in the rankings being reported. The ad hoc weights adjustments are time-dependent. If we calculate the rankings at a different point in time, the weights would be reconsidered and changed, tuned each time we calculate the rankings. This can be particularly onerous depending on how often the combined rankings are calculated (in real time, daily, weekly, monthly, quarterly, annually, etc.) particularly if the tuning is done without the assistance of any computer-implemented algorithms.

Additionally, the present disclosure differs from traditional work in the field because we are generally looking at domains with orders of magnitude more "candidates" than "voters", the reverse of conventional elections. An example of a conventional election is a U.S. presidential election, where the millions of people ("voters") are choosing between essentially two nominees ("candidates"). In the domain of conventional elections, the number of voters>>the number of candidates. Accordingly, conventional voting techniques do not examine scenarios in which the number of "candidates" is orders of magnitude more than the number "voters." For example, the Borda function is intended for use in situations when there are a large number of voters and a small number of candidates, such as in a presidential election.

In contrast, the domain addressed by exemplary embodiments of the present invention covers scenarios in which the number of voters is smaller than the number of choices, such that the number of voters<the number of candidates, and in an exemplary scenario, the number of votes<<the number of candidates.

TABLE 1

| Elections addressed by conventional vote counting methods | # of candidates << number of voters |
| --- | --- |
| Elections addressed by exemplary embodiments of the invention | # of candidates >> number of voters |

The situation where the number of votes or voters is less than the number of candidates presents unique problems to be solved. For example, techniques for maintaining reasonably high precision in the top several dozen places become very important, yet such techniques cannot be overwhelmed by the large numbers of candidates. For example, voting approaches that enumerate all possible "results" do poorly, being of low value to a user, since the number of results is exponential in the number of candidates. Additionally, uniform "spacing" between rank scores (e.g. as seen in Borda Count) works poorly with thousands of candidates. For example, if the difference between first and second place is a few fractions of a percent of the dynamic range of the ranking, it is hard to say that placing 1st is important, and yet we have an intuitive sense that the difference between 1st and 2nd place is much more important than the difference between 931st place and 932nd place. These factors and more play into the need to create new voting counting methods that better address this domain.

Features of Exemplary Embodiment

An exemplary embodiment of the present invention provides a method to combine multiple ranked lists. The method can be tuned between elevating the ranks of items in the lists that have broad appeal and elevating the ranks of items in the list that have narrow (but strong) support. The ranked lists may originate from sources of the same or different domains. For example, one source list may be based on a number of hits to specific website while another list may be based on processing user posts from a social networking site, e.g., by employing a series of unstructured information management architecture (UIMA) annotators driven off of entity spotting.

In one embodiment, an item is considered to have broad appeal when it appears in a majority of the lists, even though it may have an average or near average ranking in each list. For example, the item may appear in fifth place in eight out of the ten lists being combined. In one embodiment, an item is considered to have narrow support when it has higher than average associated ranking in a minority of the lists. For example, the item may appear in first place in two out of ten lists being combined. From one perspective, an item having narrow support can be considered to be a favorite candidate of a few voters, whereas an item having broad support can be considered to have above average or average support from many voters, though none of the voters may consider the candidate their favorite.

Table 2 below shows two ranked lists to illustrate how multiple "voters" can return their favorite candidates in rank order.

TABLE 2

| 1. Albert | 1. Charles |
| 2. Brenda | 2. Albert |
| 3. Charles | 3. Donna |
| 4. Donna | 4. Brenda |

In an exemplary embodiment, a "score" is assigned to each "place" or each position on the list. A candidate's total score is equal to the candidate's "rank" scores from each voter, added together. This total score then produces a total ranked list. The question then is: what value should be assigned to each position? What value should be assigned to each position's rank?

One way of assigning a score to a position or to a rank is by count (or number of candidates). For example, if there are 10 candidates, 1st place gets 10 points, 2nd place gets 9 points, etc. Stated another way, in a list where position 1 indicates the highest ranked candidate, position 1 (which is also in this case rank 1) gets a score of the number of total candidates minus the position plus 1. For example, position 1 (here also rank 1) gets a score=10−1+1=10. Position 2 (here also rank 2) gets a score=10−2+1=9. In a list where position 10 indicates the highest rank, position 10 (which in such case is rank 1) gets a score of 10, or score=position. One disadvantage of this approach when a large number of candidates are possible is that the approach is sensitive to single source outliers, i.e. a candidate that only occurs in one (or a few) source(s) effectively receives the lowest possible vote from the other sources, making it impossible or nearly impossible for that candidate to achieve a high overall ranking.

The country of Nauru uses a scoring method that assigns 1/n points to each rank instead—so 1st place gets 1 point, 2nd gets ½ point and so on. This helps alleviate at least partially the single source outlier problem because a high rank from any source is rewarded with a relatively high score, making the candidate more resilient to missing points from other sources. For example, a candidate may receive 1 point from being first place in one list from one source and may receive only 0.10 of a point from being tenth place in another list from another source, but the 1 point score from the first list is 10× more than 0.10 point from the second list. This makes the candidate more resilient to not getting many points from other sources. However, the Nauru approach does not provide control over how ranked lists are combined. In the Nauru approach, one cannot control how much one wants candidates with very strong minority support to be elevated in the ranks relative to candidates with weaker, but broader support. That is, one cannot tune the ranks based on, for example, business objectives.

An exemplary embodiment of the invention provides a voting system to combine multiple ranked lists, where each "voter" contributes 1/f(n), where n=rank (e.g., 1 for 1st place, 2 for 2nd place, etc.), but where the function f(n) is tunable to produce a desired spread. Accordingly, the score for each item within the list is a function of the associated rank of the item within the list. As is readily understood from the description above, this rank is a function of the item's position within the list. In certain embodiments, function f(n) is a linear function. In other embodiments, function f(n) is a logarithmic function.

For example, in some applications it may be desired to promote candidates that occur only in a few lists, but at high ranks, e.g. in lists of the popular computer games. New games will only have a few reviews in the beginning, but it may be desired to rank these new games high if they received high marks within the few reviews that are available. On the other hand, in other applications it may be more prudent to create a combined top-N list (e.g., a top-10 list) by considering broad appeal, e.g. when combining restaurant reviews it may be desired to err on the side of caution and only recommend restaurants that have received broad appeal. Accordingly, the tuning allows for adjustment based upon how much one is willing to rely on fewer ranking sources. Thus, from one perspective, the tuning allows for adjustment to the combined rankings based upon how much one is willing to risk that a few sources' rankings will reflect the reasons an entity is constructing the ranking. For example, the tuning allows adjustment based upon how much the entity is willing to risk that a few voters' rankings will reflect a business objective, such as capturing the potential popularity of a newly released game.

In one embodiment, $f(n)=n^{\wedge}(1/p)$, and p is a tuning parameter that enables selection between responsiveness in the combined list to one candidate being ranked highly in one source versus a candidate with lower but broader support among the various sources. In one exemplary embodiment, p=2.5 is used to strike a balance between broad appeal and narrow support, particularly when one is mainly interested in the top 50 items in the combined list. From one perspective, p enables trading-off between broad (and in some cases above average support) versus a top pick by a minority of the voters or sources, enabling a user to choose which type of support is more important to reflect in the combined list.

As is readily understood from the description above, the score assigned to each item within the list is a function of the associated rank n of the item within the list. So the score can be expressed as:

score (item of rank $n$ in the list)=1/$f(n)$, where $f(n)$ is, for example, $n^{\wedge}(1/p)$ or expressed as follows, which is mathematically equivalent:

score (item of rank $n$ in the list)=$f(n)$, where $f(n)$ is, for example, $1/n^{\wedge}(1/p)$ Naturally, an item of rank n within a list may not be in position N within the list, e.g., depending on whether the list is sorted in ascending or descending rank order. Thus, mathematically, rank n can be expressed as a function of its position N, or n=f(N). This function f(N) is simply N when the rank n of an item in the list is equal to the position N of the item in the list (e.g., when an item in position 1 in the list means it is ranked 1st such as in a top-N list). When the rank n of an item in a list has some other kind of relationship to the item's position in the list (e.g., in a list of ascending order) the function differs. An item's rank may be, for example, a function of the total number of items in the list minus that item's position in a list. Another way to express the score above is as follows:

score (item in position $N$ within list)=$f(n)$, where $f(n)=1/n^{\wedge}(1/p)$ and $n=f(N)$ Consider the three ranked lists in FIG. 1A. The goal is to combine the three ranked lists (A, B, and C) in FIG. 1A. The combined list differs depending on which f(n) is used. FIG. 1B shows the various combined lists when different f(n), ranging from n to n^(1/3), is used. In FIG. 1B, each combined lists is determined based on a different value for the tuning parameter p in the function f(n)=1/n^(1/p). In the first column, the combined list is computed using p=1, in the second column, p=1.5, in the third column p=2, in the fourth column p=2.5 and in the fifth column p=3. In the case of narrow support, the "top-3" are basically the #1 ranked name from each list (James, Jerry, Matthew) which is understood by viewing the rankings from the three different sources in FIG. 1A. In the case of broad support among the three lists A, B, C, "Michael" rises, because he occurs in the top 10 of two of the lists (A and B). Accordingly, as illustrated at the bottom of FIG. 1B, increasing the value of p elevates in the combined list candidates who have broad popular support among the various lists being combined.

The following is pseudo code illustrating how one might computationally compute the combined rankings according to embodiments of the invention:

```
Given a set of ranked lists l in L and candidate c in C:
    For each list l_i in L {
        For each candidate c_k in l_i {
            Score(c_k) += 1/f(rank(c_k))
        }
    }
    Rank = 1;
    Sort list of all candidates c_k in C by Score(c_k) from highest to
    lowest {
        CombinedRank(c_k) = Rank;
        Rank++;
    }
```

As seen in the pseudo code, an item in the list (expressed in the pseudo code as a candidate $c_k$ in the list $l_i$) is given a Score that is based upon a function of rank—rank($c_k$). As seen in the pseudo code, the rank (rank($c_k$)) is a function of the candidate $c_k$, which is related to the candidate's position in the list $l_i$. In the case above, the rank of each candidate in the combined list places the candidate with the highest score first. The combined list may also place the candidate with the highest score last, so as to provide the list in descending order, and still remain in accordance with embodiments of the invention.

FIG. 2 shows a graph of effects of changing the value of the tuning parameter p on rank. The x-axis of the graph is the rank of an item in the list and the y-axis of the graph is the score given to that item. As discussed above, the rank of the item is a function of that item's position in the list. As seen in FIG. 2, the lower the value of p, the greater the difference between the score given to the higher ranked items (e.g., $1^{st}$, $2^{nd}$, etc.) and the score given to lower ranked items. For example, in the graph, when p=1, the score of the item ranked 1 is 1 and the score of the item ranked 20 is approximately 0.05. When p=3, the graph shows that the score of the item ranked 1 is also 1, but the score of the item ranked 20 is almost 0.4 (or 8× greater than the score for same item when p=1). Accordingly, the higher the value of p, the smaller the difference is between the score given to the higher ranked items and the score given to lower ranked items.

In addition, as seen in FIG. 2, for each p, when the number of candidates that one is interested in viewing is smaller (e.g., the top-5), and one wants to favor narrow, strong support, a lower value of p should be selected. If one is interested in viewing more candidate (e.g., the top-100), even when one wants to favor narrow, strong support, a higher value of p could selected than the value one selects when one is interested in viewing just the top-5.

Effects of ranking in accordance with embodiments of the present invention include the following. First, the ranking method makes the difference between the top ranked candidates (sometimes referred to as the "top ranks") more significant than the difference between lower ranked candidates (sometimes referred to as the "lower ranks"). (Depending on the value of p, the "top ranks" could be the top few or top hundreds candidates or items.) Second, as p is increased, the ranking method has the effect of allowing several votes for a lower ranked candidate to "count more" than a single vote for a higher ranked candidate. For example, if p is larger, several votes of second or third place can count more than a single vote of first place. This allows the combined score for a candidate in second or third place in source lists to be higher than the combined score for a candidate for first place in one source list. This allows for elevation within the combined list of a candidate that was a second or third place candidate in multiple lists over a first place candidate in a single list. Stated another way, this allows broad support for a particular artist to "count more" than a single source ranking an artist number one, thereby reducing the ranking method's sensitivity to single source outliers.

In one application, this ranking method is used in collaboration with other vote counting frameworks. For example, this ranking method may be "plugged in" to a Borda Count-like framework. In this way, the ranking method can be cascaded with other variations. Such variations may include allocating delegates to each voter based on the size/importance of the population being represented, or other heuristics including anti-spam heuristics. In the wine example, the heuristic may, for example, require that a wine has been mentioned for at least three weeks in a row before it will be considered for inclusion in the combined list.

In one embodiment, a system is provided that permits viewing of the effects of changing the value of p on the rankings of the items in the combined list. For example, a user can adjust the value of p (e.g. by entering a value or moving a scrollbar tool in a computer user interface). In response, the system recombines the various lists based on the new p value and outputs the results (a new single, merged list) onto a display screen. Accordingly, the system provides a user interface for tunably combining multiple ranked lists, The user interface includes a display to show a single, merged list of items from multiple ranked lists. In this manner, a user may see the effects of changing the value of p on the outcome of the rankings in the combined list, and tune as appropriate to elevate the rankings of items which have characteristics which the user values. For example, the user may increase the value of p to elevate in the rankings of items having diffuse general popular support. The user may decrease the value of p to elevate in the rankings of items having strong concentrated individual/minority support. Methods implemented by such a system are in accordance with embodiments of the invention.

FIGS. 3A-3C are screenshots of a website allowing a user to view various outputted combined lists depending on the value of p. In FIG. 3A, p equals 1. In FIG. 3B, p equals 2.5. In FIG. 3C, p equals 5. As can be seen from FIGS. 3A-3C, the value of p can be represented in a manner that is more user-friendly, such as, for example, by representing a p value of 2.5 as 25. Moreover, without revealing the algorithm used to determine the ranking, the tool 302, which allows the user to select a p value, also communicates to the user that a higher p value (e.g., by indicating score 10|15|20|25|30|35|40|45|50) tends to take into account more candidates, and therefore such a selection would tend to reflect more diffuse support in the rankings, than a lower p selection (e.g., indicated by score 10| 15|20|25|30|35|40|45|50). The user may perceive the tool as indicating that more candidates are being scored when a higher number is selected. This provides the user with an intuitive reason for the changes in the ranking caused by the tuning even though the algorithm used by the tool is not scoring more or fewer candidates (as the user may believe), but instead scoring all candidates in various source lists in a novel manner. In FIGS. 3A-3C, the tool includes a set of hyperlinks (seen in FIGS. 3A-3C as underlined numbers) from among which the user can select. In other embodiments, the tool may include alternatively or additionally a scrollbar or other graphical user interface tools.

Embodiments of the invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be, for example, an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, or an optical disk. Current examples of optical disks include compact disk—read-only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 4:
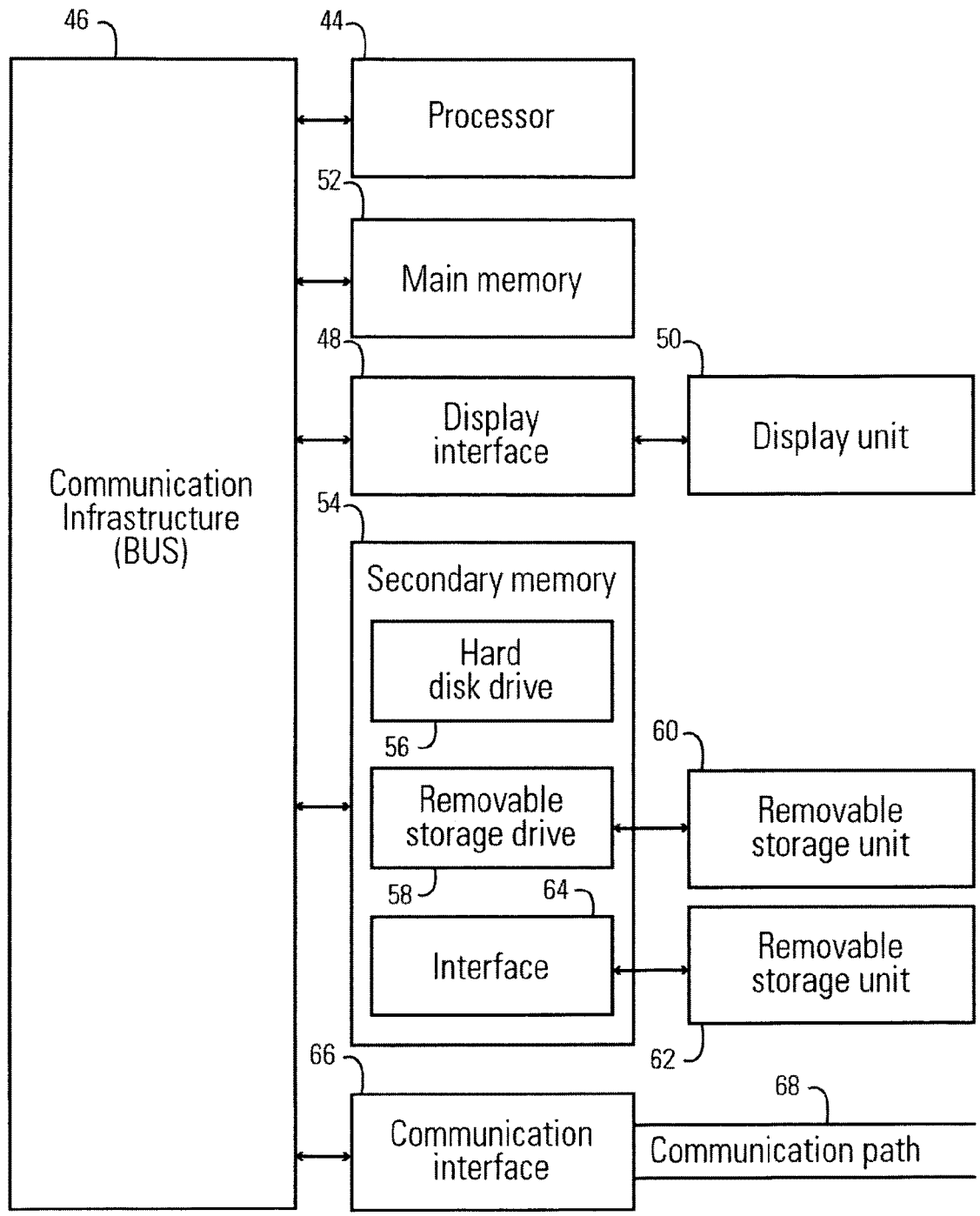
FIG. 4 is a high level block diagram showing an information processing system useful for implementing one embodiment of the present invention.

FIG. 4 is a high level block diagram showing an information processing system useful for implementing one embodiment of the present invention. The computer system includes one or more processors, such as processor 44. The processor 44 is connected to a communication infrastructure 46 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 48 that forwards graphics, text, and other data from the communication infrastructure 46 (or from a frame buffer not shown) for display on a display unit 50. The display interface may forward, for example, the graphics and text shown in FIG. 3A. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present invention as discussed herein. In particular, the computer programs, when executed, enable the processor 44 to perform the features of the computer system. Accordingly, such computer programs represent controllers of the computer system.

Figure 5:
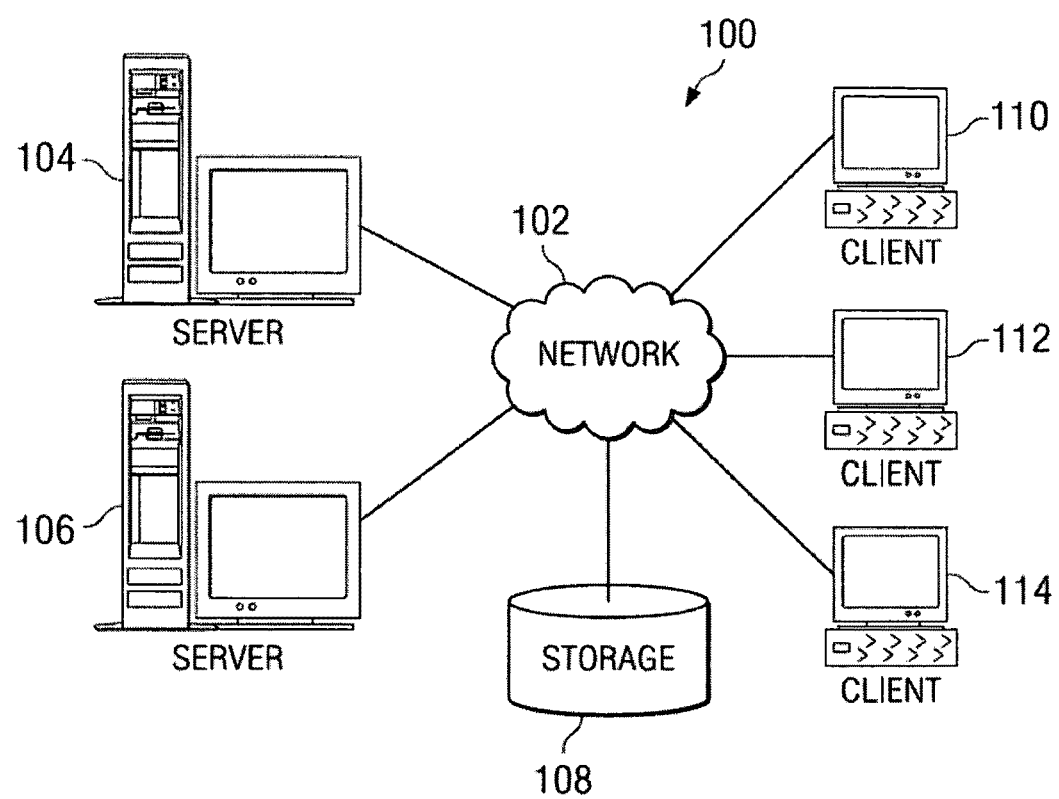
FIG. 5 represents an exemplary distributed data processing system in which aspects of the illustrative embodiments may be implemented.

FIG. 5 represents an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

In one use, as an example, clients 110 and 112 collect information (e.g., from user input) and provides it to server 104. Server 104 stores the information in storage 108. Server 106 contains hardware devices and software tools to combine the information (e.g., into information mashups and/or combined/consensus lists) according to the present invention. Server 106 transmits the combined information to server 104 and/or clients 110, 112, and/or 114, for example.

In use, client 114 may transmit a change in the tunable parameter p to the server. In response, the server recombines information based on the parameter and outputs a different list to the client. This list may take the form of a webpage, e.g., seen in FIGS. 3A-3C.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily referring to the same embodiment.

Thus, a system and method for determining preferences from information mashups and, in particular, for constructing targeted rankings from multiple information sources is disclosed. While the preferred embodiments of the present invention have been described, it will be understood that modifications and adaptations to the embodiments shown may occur to one of ordinary skill in the art without departing from the scope of the present invention as set forth in the claims. Thus, the scope of this invention is to be construed according to the claims and not limited by the specific details disclosed in the exemplary embodiments.

We claim:

1. A computer-implemented method for combining multiple ranked lists, the method comprising:
   receiving multiple lists, wherein each list comprises items each having an associated rank, n, within the list and wherein at least one of the items is present in more than one of the multiple lists; and
   combining the items in the multiple lists into a combined list, wherein the combining comprises:
      assigning a value to a variable p, the value being neither 0 nor negative;
      for each list in the multiple lists, computing a score for each item within the list, wherein the score is a function of the associated rank within the list, and wherein the function is equal to $1/(n^{(1/p)})$;
      for each item, summing corresponding scores from the multiple lists for a same item to produce a total score for the item;
      ranking each item based on the corresponding total score of each item; and
      outputting the combined list based on the ranking.

2. The computer-implemented method of claim 1, wherein assigning a value to a variable p comprises assigning a value of 2.5 to the variable p.

3. The computer-implemented method of claim 2, further comprising:
   increasing the value of the variable p to increase ranking in the combined list of items appearing in a majority of the multiple lists; and
   repeating the combining.

4. The computer-implemented method of claim 1, further comprising:
   decreasing the value of the variable p to increase ranking in the combined list of items having higher than average associated ranking in a minority of the multiple lists; and
   repeating the combining.

5. The computer-implemented method of claim 1, further comprising:
   receiving a new value for the variable p; and
   repeating the combining using the new value as the value for the variable p.

6. The computer-implemented method of claim 1, further comprising:
   assigning a new value to the variable p to adjust the ranking in the combined list of items; and
   repeating the combining.

7. The computer-implemented method of claim 1, wherein assigning the value to the variable p comprises automatically assigning the value to the variable p based on a predetermined business objective.

8. The computer-implemented method of claim 1, further comprising:
   calculating the associated rank n for each item based on a position of the item with the corresponding list in the multiple lists.

9. A computer program product for combining multiple ranked lists, said computer program product comprising:
   a non-transitory computer readable medium;
   first program instructions to receive multiple lists, wherein each list comprises items each having an associated rank, n, within the list and wherein at least one of the items is present in more than one of the multiple lists; and
   second program instructions to combine the items in the multiple lists into a combined list, wherein the combining comprises:
      assigning a value to a variable p, the value being neither 0 nor negative;
      for each list in the multiple lists, computing a score for each item within the list, wherein the score is a function of the associated rank within the list, and wherein the function is equal to $1/(n^{(1/p)})$;
      for each item, summing corresponding scores from the multiple lists for a same item to produce a total score for the item;
      ranking each item based on the corresponding total score of each item; and
      outputting the combined list based on the ranking,
      wherein said first and second program instructions are stored on said computer readable media.

10. The computer program product of claim 9, further comprising:
    third program instructions to assign a new value to the variable p to adjust the ranking in the combined list of items; and
    fourth program instructions to repeat the combining,
    wherein said third and fourth program instructions are stored on said computer readable media.

11. The computer program product of claim 9, wherein assigning the value to the variable p comprises automatically assigning the value to the variable p based on a predetermined business objective.

12. A method for providing a combined ranked list from multiple ranked lists, the method comprising:
    receiving an identification of a domain of interest;
    receiving information describing a business objective;
    gathering multiple ranked lists on the domain of interest from multiple sources, wherein each list comprises items each having an associated rank, n, within the list;
    combining the items in the multiple lists into a combined list, wherein the combining comprises:
       automatically computing a score for each item within each of the multiple lists using a function equal to $1/(n^{(1/p)})$, wherein p is a variable and the value of p is determined based on the business objective and is neither 0 nor negative;
       for each item, combining the corresponding scores from the multiple lists for a same item to create a total score; and
       combining the items into a combined list, wherein the rankings of the items with the combined list is based on the total score of each item; and
    transmitting the combined list.

13. The method of claim 12 wherein the multiple sources have differing modalities.

14. The method of claim 13 wherein gathering the multiple ranked lists comprises:
gathering unstructured data indicating preferences for items within the domain of interest; and
constructing a ranked list from the unstructured data.

15. The method of claim 12 where the value of p is higher when the business objective indicates interest in ranking items with broad appeal higher than items with narrow appeal than when the business objective indicates interest in ranking items with narrow appeal higher than items with broad appeal.

16. The method of claim 12, further comprising:
calculating the associated rank n for each item within each list based on a position of the item with the corresponding list in the multiple lists.

17. The method of claim 12, further comprising:
receiving further information describing the business objective;
tuning the value of the variable p based on the further information;
repeating the combining based on the tuning; and
repeating the transmitting based on the repeating of the combining.

* * * * *